United States Patent [19]

Uehori et al.

[11] 4,248,907

[45] Feb. 3, 1981

[54] PROCESS FOR PREPARING MAGNETIC POWDER

[75] Inventors: Tatsuo Uehori, Miyotamachi; Ryouichi Horimoto, Komoro, both of Japan

[73] Assignee: TDK Electronics Company, Limited, Tokyo, Japan

[21] Appl. No.: 60,733

[22] Filed: Jul. 25, 1979

[30] Foreign Application Priority Data

Aug. 1, 1978 [JP] Japan ................................. 53-93869

[51] Int. Cl.³ .............................................. B05D 5/12
[52] U.S. Cl. ................................. 427/127; 148/105; 148/122
[58] Field of Search .............................. 427/127–132, 427/48; 148/105, 122

[56] References Cited

U.S. PATENT DOCUMENTS 3,652,334  3/1972  Abeck .................................. 427/127

Primary Examiner—Bernard D. Pianalto
Attorney, Agent, or Firm—Oblon, Fisher, Spivak, McClelland & Maier

[57] ABSTRACT

A magnetic powder is prepared by dispersing iron oxide or iron oxide hydrate which can be coated or doped with at least one of cobalt, nickel, tin, titanium, bismuth, zinc or antimony or its compound, as the starting material into an aqueous solution of a water soluble resin and separating the powder and heating it in a reducing atmosphere to reduce it.

7 Claims, No Drawings

PROCESS FOR PREPARING MAGNETIC POWDER

BACKGROUND OF THE INVENTION

The present invention relates to a process for preparing a magnetic powder used for a magnetic recording medium.

Magnetic powders for magnetic recording media have been usually prepared by heating and reducing an iron oxide or an iron oxide hydrate which can be coated or doped with at least one of cobalt, nickel, tin, titanium, bismuth, zinc or antimony or its compounds, in a reducing atmosphere. In the process for preparing a magnetic powder, phenomena of melt bonding between particles and sintering are easily caused in the heating and reducing reactions whereby the improvements of magnetic characteristics such as coercive force, residual magnetic flux density, acicular ratio of the magnetic powder are limited.

In order to prevent the phenomena of the melt-bonding between the particles and the sintering, it is preferable to carry out the reduction at lower temperature. Thus, it takes a long time for the reduction so as to cause inferior industrial efficiency in the operation.

SUMMARY OF THE INVENTION

It is an object of the present invention to overcome such disadvantages and to provide a process for preparing a magnetic powder so as to quickly prepare the magnetic powder having high acicular ratio, to avoid phenomenon of the melt-bonding or sintering in the reduction.

The foregoing and other objects of the present invention have been attained by dispersing a fine powder of iron oxide or iron oxide hydrate which can be coated or doped with at least one of cobalt, nickel, tin, titanium, bismuth, zinc or antimony or its compound as the starting material, into an aqueous solution of a water soluble resin and separating by filtration and drying the fine powder prior to the reduction.

DETAILED DESCRIPTION OF THE PREFERRED EMBODIMENTS

The fine powder is coated with the water soluble resin by such pre-treatment whereby the sintering of the fine powder is prevented even though such fine powder is sintered in the reduction of the conventional process, and the original shapes of the iron oxide or iron oxide hydrate are not pulverized to maintain it until the end of the reduction.

The detail of the magnetic powder is illustrated in U.S. Pat. No. 4,010,310 and other prior arts. For example, acicular iron oxide or iron oxide hydrate can be used. They can be modified by at least one of cobalt, nickel, tin, titanium, bismuth, zinc or antimony or its compound. In the aqueous solution of the water soluble resin, the starting material of the iron oxide, the iron oxide hydrate or the modified iron oxide or the modified iron oxide hydrate is dispersed so as to coat its surface with the water soluble resin film.

The kinds of the water soluble resin are not critical and can be various hydrophilic macromolecular compounds which are well-known in the art, such as polyvinyl alcohol, polyvinylpyrrolidone, polyvinyl methyl ether, gelatin starch, starch derivatives, cellulose derivatives polysaccharides and polysaccharide derivatives. A concentration of the water soluble resin can be selected as desired and it is usually ranging from 0.3 to 30 wt.% preferably 1 to 15 wt.%. It is possible to add an additive such as a surfactant or a metal salt if desired. A concentration of the iron oxide or iron oxide hydrate dispersed in the aqueous solution is in a range of forming a slurry. The slurry is usually filtrated by centrifugal separation or forcible filtration etc. The residue is dried, whereby the iron oxide or iron oxide hydrate powder is coated with the water soluble resin.

The resulting coated iron oxide or iron oxide hydrate is reduced by heating in a reducing atmosphere such as in hydrogen gas, or a mixed gas of carbon monoxide and hydrogen, a mixed gas of hydrogen and ammonia. Any other reducing gas can be used for the reducing atmosphere. The temperature in the reduction is usually lower than its sintering temperature preferably in a range of 300° to 500° C. especially 350° to 400° C.

In accordance with the process of the present invention, the sintering of the fine powder can be prevented in the reduction and the magnetic powder having high acicular ratio can be quickly prepared.

A further understanding can be obtained by reference to certain specific examples which are provided herein for purposes of illustration only and not to be limiting unless otherwise specified.

EXAMPLE 1

Into 5% aqueous solution of polyvinylpyrrolidone, 10 g. of an acicular iron oxide having an average specific surface area (hereinafter referring to as BET value of 20 m.$^2$/g.) was dispersed. The iron oxide was separated by filtration and dried and then reduced at 380° C. in a reducing atmosphere of hydrogen gas to obtain a magnetic powder.

EXAMPLE 2

Into 2% aqueous solution of polyvinyl alcohol, 10 g. of iron oxide hydrate in which cobalt and chromium were doped, (BET value of 40 m.$^2$/g.) was dispersed. The particles were separated by filtration and dried and then reduced at 400° C. in a reducing atmosphere of a mixed gas containing 50% of CO and 50% of H$_2$ to obtain a magnetic powder comprising a main component of iron.

EXAMPLE 3

Into 2% aqueous solution of polyvinyl alcohol, 1 kg. of iron oxide hydrate in which nickel and antimony were doped, (BET value of 35 m.$^2$/g.) was dispersed. The particles were separated by filtration and dried and then reduced at 360° C. in a reducing atmosphere of hydrogen gas containing 2% of ammonia gas to obtain a magnetic powder comprising a main component of iron.

EXAMPLE 4

Into 2% aqueous solution of polyvinylpyrrolidone, 1 kg. of acicular iron oxide on which a cobalt compound was coated (BET value of 25 m.$^2$/g.) was dispersed. The particles were separated by filtration and dried and then reduced at 400° C. in hydrogen gas flow to obtain a magnetic powder comprising a main component of iron.

EXAMPLE 5

Into 3% aqueous solution of polyvinylpyrrolidone, an acicular iron oxide on which a cobalt compound and a tin compound were coated (BET value of 20 m.²/g.) was dispersed. The particles were separated by filtration and dried and then reduced at 420° C. in hydrogen gas flow to obtain a magnetic powder comprising a main component of iron.

EXAMPLE 6

Into 1% aqueous solution of polyvinyl alcohol, an acicular iron oxide on which a cobalt compound and a zinc compound were coated (BET value of 18 m.²/g.) was dispersed. The particles were separated by filtration and dried and then reduced at 360° C. in a reducing atmosphere of hydrogen gas to obtain a magnetic powder comprising a main component of iron.

EXAMPLE 7

Into 3% aqueous solution of polyvinylpyrrolidone, an acicular iron oxide on which a titanium compound was coated (BET value of 18 m.²/g.) was dispered. The particles were separated by filtration and dried and then reduced at 420° C. in a reducing atmosphere of hydrogen gas to obtain a magnetic powder comprising a main component of iron.

EXAMPLE 8

Into 2.5% aqueous solution of polyvinyl alcohol, an acicular iron oxide on which a cobalt compound and a bismuth compound were coated (BET value of 25 m.²/g.) was dispersed. The particles were separated by filtration and dried and then reduced at 400° C. in a reducing atmosphere of hydrogen gas to obtain a magnetic powder comprising a main component of iron.

EXAMPLE 9

Into 10% aqueous solution of polyvinyl alcohol, 100 g. of the doped iron oxide hydrate of Example 2 was dispersed. The particles were separated by a filtration and dried and then reduced at 400° C. in a reducing atmosphere of hydrogen gas to obtain a magnetic powder comprising a main component of iron.

EXAMPLE 10

Into 15% aqueous solution of polyvinyl alcohol, 100 g. of the doped iron oxide hydrate of Example 2 was dispersed. The particles were separated by filtration and dried and then reduced at 400° C. in a reducing atmosphere of hydrogen gas to obtain a magnetic powder comprising a main component of iron.

EXAMPLE 11

Into 10% aqueous solution of polyvinylpyrrolidone, 1 kg. of the coated iron oxide of Example 4 was dispersed. The particles were separated by filtration and dried and then reduced at 400° C. in hydrogen gas flow to obtain a magnetic powder comprising a main component of iron.

REFERENCE

As references corresponding to Examples 1 to 11, each magnetic powder was prepared by the same conditions except employing the dispersing and coating step using the water soluble resin. These are shown as References 1 to 11.

Magnetic characteristics of these magnetic powders prepared in Examples 1 to 11 and References 1 to 11 were measured. The results are shown in Table 1.

TABLE 1

|  | Coercive force $H_c$ (Oe) | Maximum magnetization $\sigma s$ (emu/g.) | Acicular ratio $\sigma r/\sigma s$ |
|---|---|---|---|
| Example 1 | 1,000 | 150 | 0.50 |
| Reference 1 | 1,050 | 150 | 0.35 |
| Example 2 | 1,200 | 145 | 0.49 |
| Reference 2 | 1,200 | 145 | 0.33 |
| Example 3 | 1,100 | 138 | 0.51 |
| Reference 3 | 1,190 | 138 | 0.38 |
| Example 4 | 1,150 | 145 | 0.50 |
| Reference 4 | 1,160 | 146 | 0.34 |
| Example 5 | 1,000 | 140 | 0.50 |
| Reference 5 | 980 | 140 | 0.32 |
| Example 6 | 950 | 135 | 0.51 |
| Reference 6 | 950 | 136 | 0.35 |
| Example 7 | 980 | 140 | 0.49 |
| Reference 7 | 970 | 139 | 0.34 |
| Example 8 | 1,200 | 135 | 0.48 |
| Reference 8 | 1,150 | 135 | 0.33 |
| Example 9 | 1,300 | 142 | 0.52 |
| Reference 9 | 1,200 | 145 | 0.33 |
| Example 10 | 1,400 | 140 | 0.54 |
| Reference 10 | 1,200 | 145 | 0.34 |
| Example 11 | 1,300 | 140 | 0.53 |
| Reference 11 | 1,100 | 145 | 0.38 |

As it is clearly understood from the results in Table 1, the maximum acicular ratio of the magnetic powder prepared in References 1 to 8 was 0.38 whereas the acicular ratios of the magnetic powder prepared in Examples 1 to 8 were greater than 0.48. In accordance with the process of the present invention, a magnetic powder having high quality and excellent high acicular ratio can be obtained.

We claim:
1. A process for preparing a magnetic powder, which comprises:
    dispersing finely powdered iron oxide or iron oxide hydrate optionally coated or doped with at least one element selected from the group consisting of cobalt, nickel, tin, titanium, bismuth, zinc and antimony or at least one compound of said element(s) into an aqueous solution containing a hydrophilic macromolecular compound in an amount sufficient to coat said finely powdered iron oxide or iron oxide hydrate;
    separating said coated powdered material; and
    reducing said powdered material in a reducing atmosphere.
2. The process according to claim 1 wherein said hydrophilic macromolecular compound is polyvinyl alcohol, polyvinylpyrrolidone, polyvinyl methyl ether, gelatin starch, a starch derivative, a cellulose derivative, a polysaccharide or a polysaccharide derivative.
3. The process according to claim 1 or 2 wherein the aqueous solution of said hydrophilic macromolecular compound is at a concentration of 0.3 to 30.0 wt. %.
4. The process according to claim 1 or 2, wherein the reduction is conducted by heating the powder at a temperature of 300° to 500° C., but less than the sintering temperature of said powder in the reducing atmosphere.
5. The process according to claim 1 or 2, wherein the dispersed iron oxide or iron oxide hydrate is separated by forcible filtration or centrifugal separation before reduction.
6. The process according to claim 1, wherein the said hydrophilic macromolecular compound in the aqueous solution is at a concentration of 1.0 to 15.0 wt. %.
7. A process for preparing a magnetic powder, which comprises:

dispersing finely powdered iron oxide or iron oxide hydrate optionally coated or doped with at least one element selected from the group consisting of cobalt, nickel, tin, titanium, bismuth, zinc and antimony or at least one compound of said element(s) into an aqueous solution containing from 0.3 to 30.0 wt. % of polyvinyl alcohol, polyvinyl pyrrolidone, polyvinylmethyl ether, gelatin, starch, a starch derivative, a cellulose derivative, a polysaccharide or a polysaccharide derivative;

separating said coated powdered material; and reducing said powdered material in a reducing atmosphere.

* * * * *